US012776527B2

(12) United States Patent
Kubota et al.

(10) Patent No.: US 12,776,527 B2
(45) Date of Patent: Oct. 27, 2026

(54) BATTERY PACK

(71) Applicant: Vehicle Energy Japan Inc., Hitachinaka (JP)

(72) Inventors: Osamu Kubota, Hitachinaka (JP); Sadayuki Aoki, Hitachinaka (JP); Kazunori Ojima, Hitachinaka (JP); Yoshitaka Watahiki, Hitachinaka (JP); Akira Irie, Hitachinaka (JP); Tatsuo Sugawara, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 603 days.

(21) Appl. No.: 17/059,684

(22) PCT Filed: Mar. 6, 2019

(86) PCT No.: PCT/JP2019/008765
§ 371 (c)(1),
(2) Date: Nov. 30, 2020

(87) PCT Pub. No.: WO2020/066060
PCT Pub. Date: Apr. 2, 2020

(65) Prior Publication Data
US 2021/0218082 A1 Jul. 15, 2021

(30) Foreign Application Priority Data
Sep. 26, 2018 (JP) ................................ 2018-180478

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/647* (2015.04);
(Continued)

(58) Field of Classification Search
CPC .... Y02E 60/10; H01M 50/244; H01M 50/209
See application file for complete search history.

(56) References Cited

U.S. PATENT DOCUMENTS

2002/0061436 A1* 5/2002 Inagaki ................ H01M 50/24 429/176
2012/0301769 A1 11/2012 Okada
(Continued)

FOREIGN PATENT DOCUMENTS

JP 2009-110832 A 5/2009
JP 2012033419 A * 2/2012
(Continued)

OTHER PUBLICATIONS

Jeon et al., KR-20080010156 Machine Translation (Year: 2008).*
(Continued)

*Primary Examiner* — Ula C Ruddock
*Assistant Examiner* — Anna Korovina
(74) *Attorney, Agent, or Firm* — FOLEY & LARDNER LLP

(57) ABSTRACT

Provided is a battery pack capable of preventing a damage to the insulation layer on the bottom face of each of battery cells and improving the cooling performance for the battery cells as compared with the conventional configuration. A battery pack includes a plurality of battery cells 10, a plurality of cell holders 20, a plurality of plates 30, an insulation layer 40 on the entire bottom face **10*b* of each battery cell 10, a heat-transfer sheet 50, and a cooler 60 to cool the battery cells 10 via the heat-transfer sheet 50. The lower end 30*b* of each plate 30 protrudes downward from the lower face 40*b* of each insulation layer 40. The cell holder 20 has supports that support the side faces of the battery cell 10 and an opening 22 that exposes the entire lower face 40*b* of the insulation layer 40 to the heat-transfer sheet 50**.

11 Claims, 7 Drawing Sheets

(51) Int. Cl.

| | |
|---|---|
| ***H01M 10/647*** | (2014.01) |
| ***H01M 10/653*** | (2014.01) |
| ***H01M 10/6554*** | (2014.01) |
| ***H01M 10/658*** | (2014.01) |
| ***H01M 50/209*** | (2021.01) |
| ***H01M 50/249*** | (2021.01) |
| *H01M 50/276* | (2021.01) |

(52) U.S. Cl.

CPC ..... *H01M 10/653* (2015.04); *H01M 10/6554* (2015.04); *H01M 10/658* (2015.04); *H01M 50/249* (2021.01); *H01M 50/209* (2021.01); *H01M 50/276* (2021.01); *H01M 2220/20* (2013.01)

(56) References Cited

U.S. PATENT DOCUMENTS

| | | | | | |
|---|---|---|---|---|---|
| 2013/0004822 | A1 | 1/2013 | Hashimoto et al. | | |
| 2013/0337310 | A1 | 12/2013 | Omura et al. | | |
| 2015/0064523 | A1* | 3/2015 | Lim | H01M 50/507 | 429/82 |
| 2015/0333304 | A1* | 11/2015 | Sekine | H01M 10/6555 | 429/153 |
| 2016/0141737 | A1 | 5/2016 | Kubota | | |
| 2018/0123105 | A1 | 5/2018 | Tokoo et al. | | |
| 2018/0151859 | A1* | 5/2018 | Aizawa | H01M 50/505 | |
| 2020/0075988 | A1 | 3/2020 | Omura | | |
| 2020/0411922 | A1* | 12/2020 | Kuramitsu | H01M 10/659 | |

FOREIGN PATENT DOCUMENTS

| | | | | | |
|---|---|---|---|---|---|
| JP | 2012-248339 | A | | 12/2012 | |
| JP | 2013-125617 | A | | 6/2013 | |
| JP | 2014-010983 | A | | 1/2014 | |
| JP | 2017-174831 | A | | 9/2017 | |
| JP | 2017-212214 | A | | 11/2017 | |
| JP | 2018-018672 | A | | 2/2018 | |
| KR | 20080010156 | | * | 1/2008 | |
| WO | WO-2012/057169 | A1 | | 5/2012 | |
| WO | WO-2013038520 | A1 | * | 3/2013 | H01M 10/613 |
| WO | WO-2017006763 | A1 | * | 1/2017 | H01M 10/425 |
| WO | WO-2017057207 | A1 | * | 4/2017 | |
| WO | WO-2017/119206 | A1 | | 7/2017 | |
| WO | WO-2018/163816 | A1 | | 9/2018 | |
| WO | WO-2019058937 | A1 | * | 3/2019 | H01M 10/613 |

OTHER PUBLICATIONS

Asai WO 2012057169 Machine Translation (Year: 2012).*
Suga WO 2013038520 Machine Translation (Year: 2013).*
Ojima WO-2017057207 machine translation (Year: 2017).*
Takashina, JP-2012033419 Machine Translation (Year: 2012).*
International Search Report with English translation and Written Opinion issued in corresponding application No. PCT/JP2019/008765 dated May 28, 2019.
Extended European Search Report dated Jun. 13, 2022 issued in EP Application No. 19867210.7, 5 pages.
Office Action dated May 29, 2026 issued in CN Application No. 202211285586.1, 6 pages.

* cited by examiner

BATTERY PACK

TECHNICAL FIELD

The present disclosure relates to battery packs.

BACKGROUND ART

Conventionally inventions relating to a power supply including a plurality of battery cells stacked have been known (see the following Patent Literature 1). This conventional power supply includes a battery stack having a plurality of battery cells stacked, insulating separators disposed between the battery cells, and a fixing member for fastening the battery stack in the stacking direction.

The outer case of each battery cell is made of metal, and so this conventional power supply includes the insulating separators between the battery cells to prevent the outer cases of the adjacent battery cells from coming into contact and causing a short-circuit. The outer case of the battery cell may be covered with an insulating film to prevent a short-circuit due to dew condensation, for example (see the same document, paragraph 0028, etc.).

CITATION LIST

Patent Literature

Patent Literature 1: JP 2014-010983 A

SUMMARY OF INVENTION

Technical Problem

In general, a battery pack including a plurality of battery cells has a problem that the insulating film covering the bottom face of each battery cell is easily damaged during the manufacturing process. In the conventional power supply as described above, each separator has a protrusion covering both ends of the bottom face of the battery cell (see this document, paragraph 0048, FIG. 6, FIG. 7, FIG. 12 and the like).

When a plurality of battery cells stacked with the separators interposed therebetween is placed on a workbench, for example, during the manufacturing process of this conventional power supply, the protrusions of the separators covering the bottom face of each battery cell at the both ends come in contact with the workbench. These protrusions define a space between the bottom face of each battery cell and the workbench. This space avoids a damage of the insulating film covering the bottom face of the battery cell due to foreign matter between the workbench and the bottom face of the battery cell.

In this conventional power supply, the protrusions on the lower end of each separator intervenes between the cooling plate and the battery cell, and so insulates the battery cell from the cooling plate (see this document, paragraph 0048, FIG. 6, FIG. 7, FIG. 12 and the like). This conventional power supply further includes a heat-transfer sheet having thermal conductivity between the bottom face of the battery cells and the cooling plate (see this document, paragraph 0082, FIG. 2, FIG. 3, FIG. 5 and the like), and so enhances the cooling performance of the cooling plate for the battery cells.

In this conventional power supply, however, each separator has protrusions covering both ends of the bottom face of the battery cells, and so has a problem in the cooling performance for the battery cells.

The present disclosure provides a battery pack capable of preventing a damage to the insulation layer on the bottom face of each battery cell and improving the cooling performance for the battery cells as compared with the conventional configuration.

Solution to Problem

According to one aspect of the present disclosure, a battery pack includes: a plurality of flattened battery cells; a plurality of cell holders located on both sides of each of the plurality of battery cells in a thickness direction of the battery cells to hold and stack the plurality of battery cells in the thickness direction; a plurality of plates that support the plurality of battery cells from both sides in a stacking direction of the plurality of battery cells via the cell holders; an insulation layer on an entire bottom face of each of the battery cells; a heat-transfer sheet in contact with a lower face of each insulation layer; and a cooler configured to cool the plurality of battery cells via the heat-transfer sheet. Each of the plates has a lower end protruding downward from the lower face of each insulation layer, and each cell holder has a support that supports a side face of a corresponding battery cell of the plurality of battery cells, and an opening that exposes an entire lower face of the insulation layer to the heat-transfer sheet.

Advantageous Effects of Invention

The one aspect of the present disclosure provides a battery pack capable of preventing a damage to the insulation layer on the bottom face of each battery cell and improving the cooling performance for the battery cells as compared with the conventional configuration.

DESCRIPTION OF EMBODIMENTS

The following describes a battery pack according to one embodiment of the present disclosure, with reference to the drawings.

Figure 1:
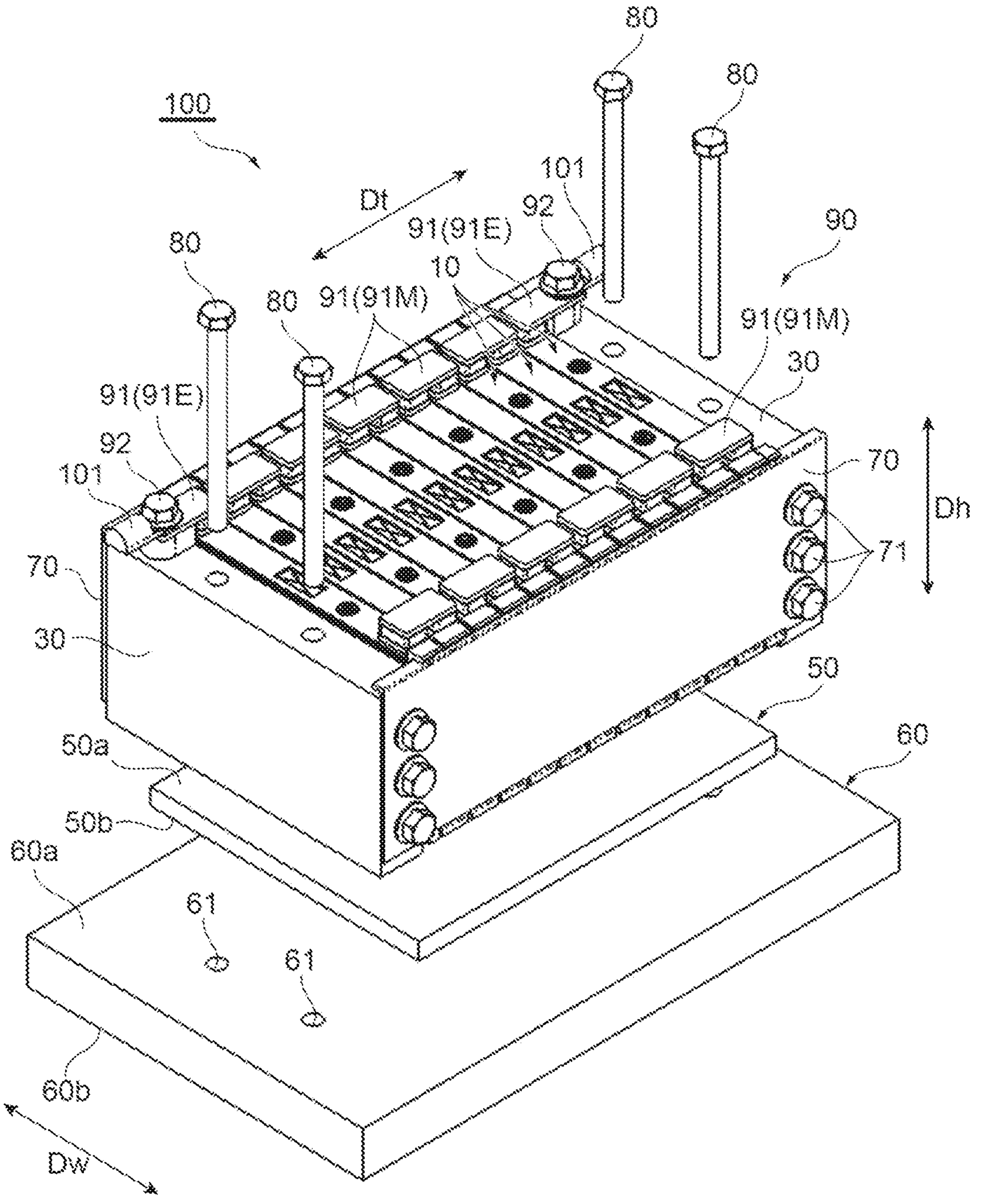
FIG. 1 is an exploded perspective view schematically showing the configuration of a battery pack according to one embodiment of the present disclosure.
Figure 2:
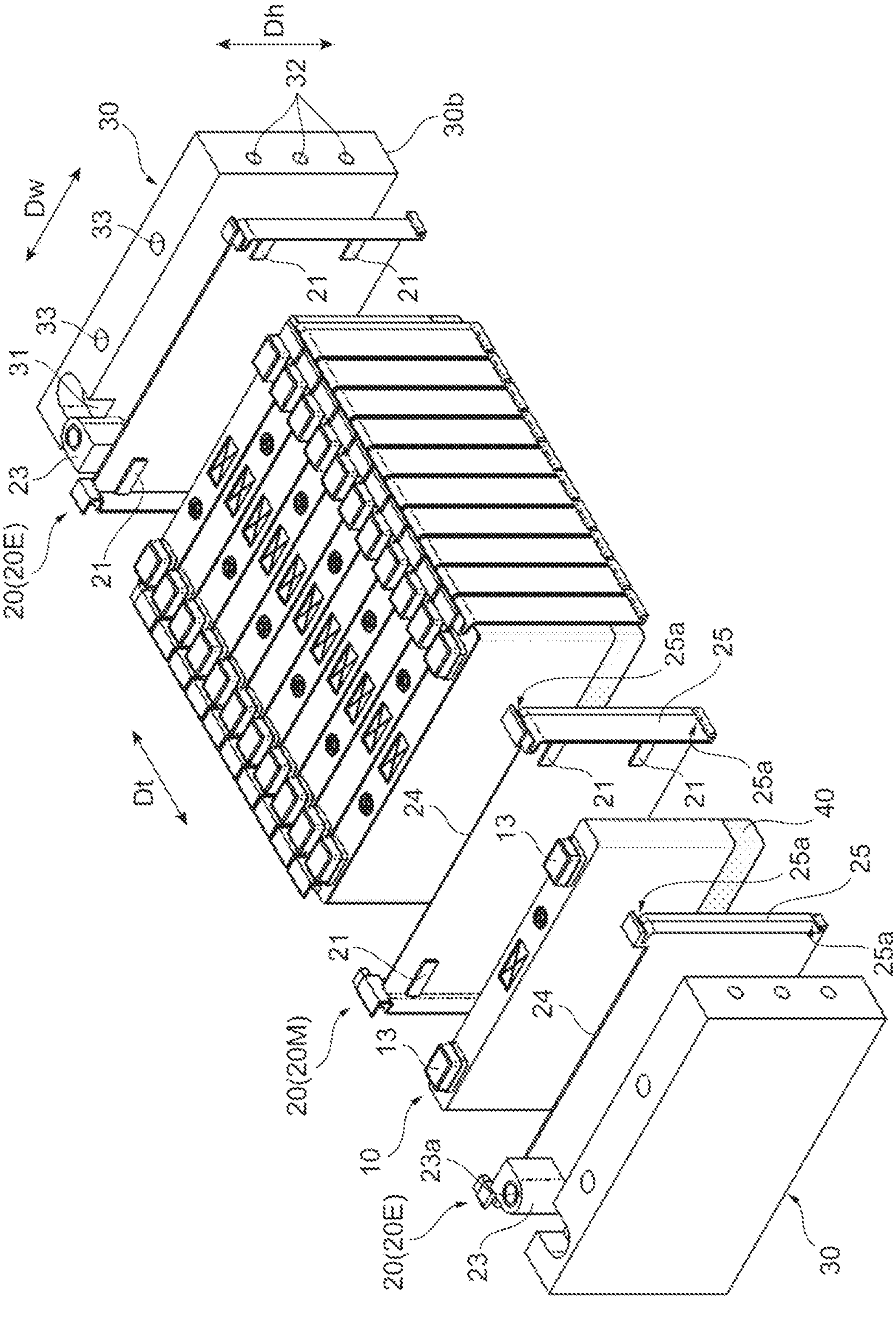
FIG. 2 is an exploded perspective view of a battery module making up the battery pack shown in FIG. 1.
Figure 3:
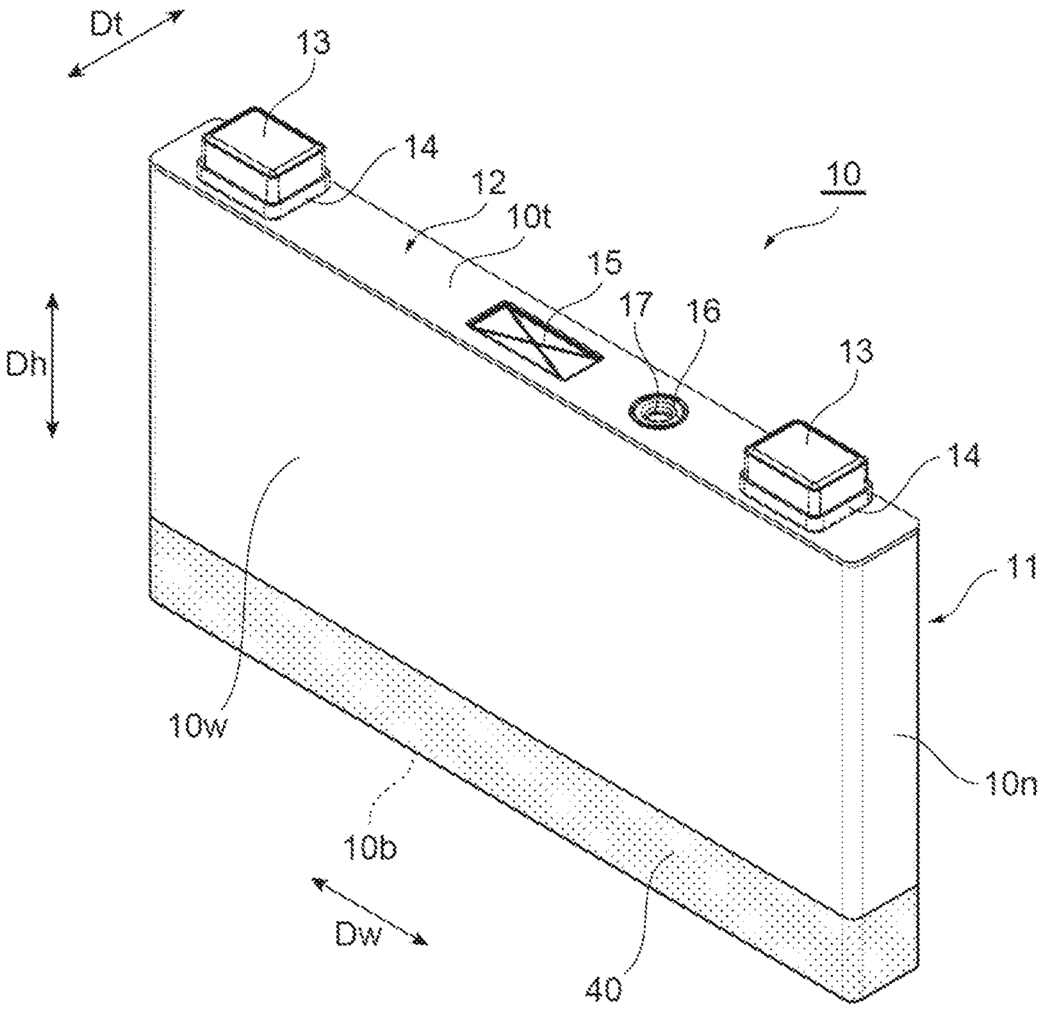
FIG. 3 is a perspective view of a battery cell making up the battery module shown in FIG. 2.
Figure 4:
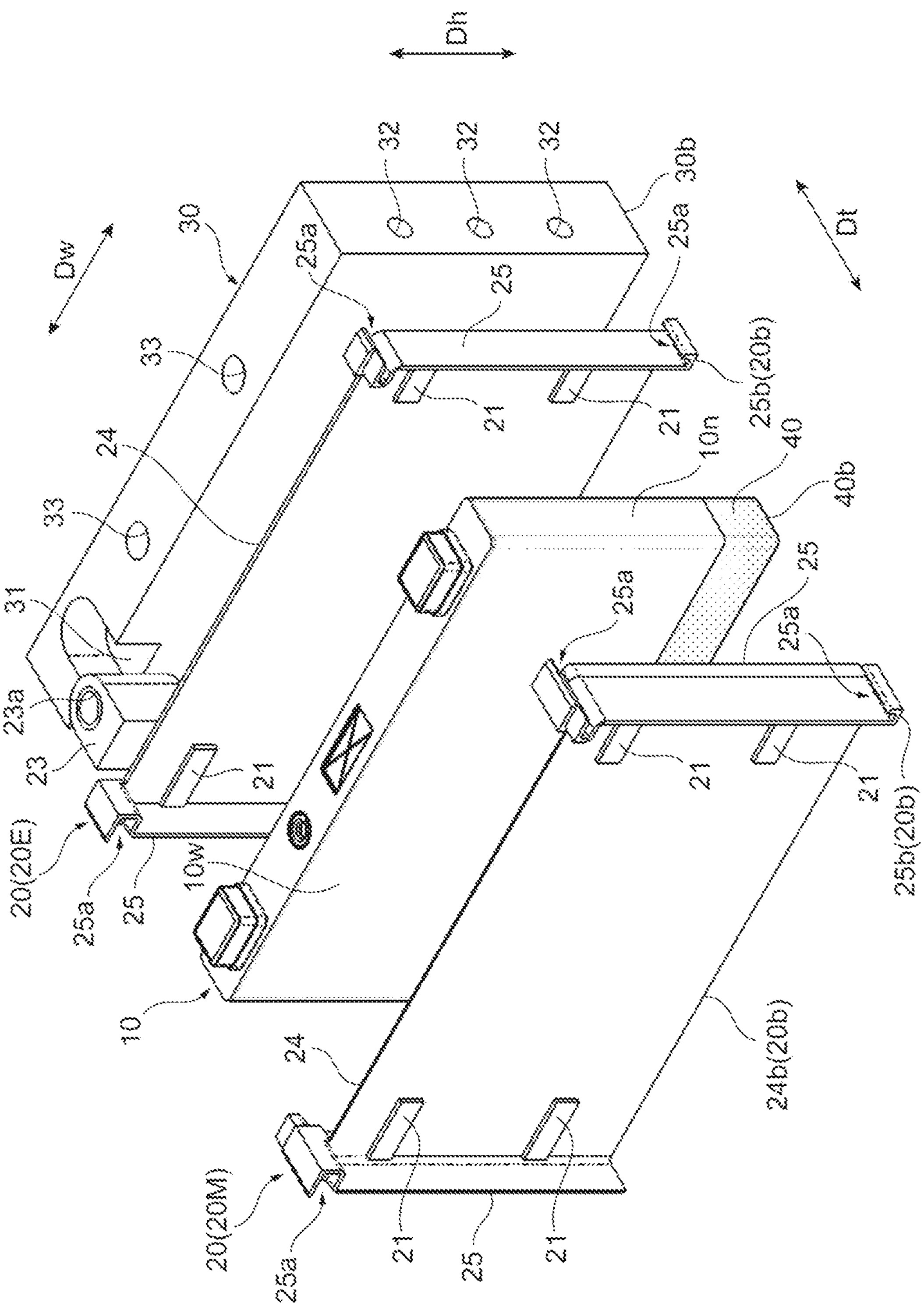
FIG. 4 is a perspective view of the members making up the battery module shown in FIG. 2.
Figure 5:
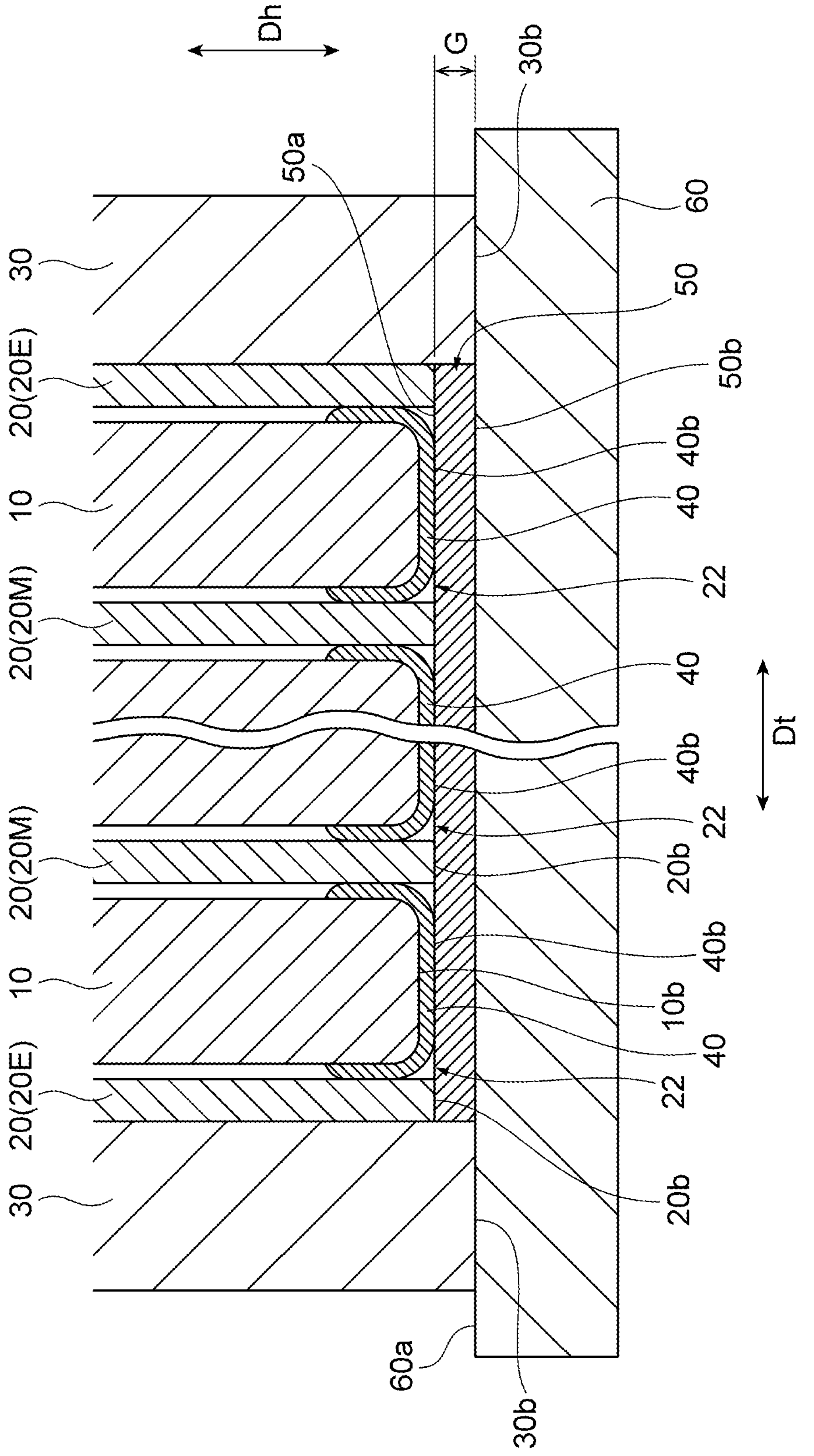
FIG. 5 is a schematic enlarged cross-sectional view of the battery pack shown in FIG. 1 along the stacking direction of the battery cells.

FIG. 1 is an exploded perspective view schematically showing the configuration of a battery pack 100 according to one embodiment of the present disclosure. FIG. 2 is an exploded perspective view of a battery module 90 making up the battery pack 100 shown in FIG. 1. FIG. 3 is a perspective view of a battery cell 10 making up the battery module 90 shown in FIG. 2. FIG. 4 is a perspective view of the members making up the battery module 90 shown in FIG. 2. FIG. 5 is a schematic enlarged cross-sectional view of the battery pack 100 shown in FIG. 1 along the stacking direction of the battery cells 10. The upper, lower, left, and right in the present disclosure are convenient directions for explaining various parts of the battery pack 100, and do not limit the direction when the battery pack 100 is used.

The battery pack 100 of the present embodiment is mounted on a vehicle, such as an electric vehicle (EV) or a hybrid electric vehicle (HEV), and configures a power storage device for the vehicle. Although the details are described later, the battery pack 100 of the present embodiment has the following configuration as major features.

The battery pack 100 of the present embodiment includes a plurality of flattened battery cells 10, a plurality of cell holders 20, a plurality of plates 30, an insulation layer 40, a heat-transfer sheet 50, and a cooler 60. The plurality of cell holders 20 holds the individual battery cells 10 from their both sides in the thickness direction Dt for stacking them in the thickness direction Dt. The plurality of plates 30 supports the plurality of battery cells 10 from both sides in the stacking direction (thickness direction Dt) via the cell holders 20. The insulation layer 40 extends over the entire bottom face 10*b* of each battery cell 10. The heat-transfer sheet 50 is in contact with the lower face 40*b* of the insulation layer 40. The cooler 60 cools the plurality of battery cells 10 via the heat-transfer sheet 50. The lower end 30*b* of each plate 30 protrudes downward from the lower face 40*b* of each insulation layer 40. The cell holder 20 has supports 21 that support the side faces of the battery cell 10 and an opening 22 that exposes the entire lower face 40*b* of the insulation layer 40 to the heat-transfer sheet 50.

The following describes various parts of the battery pack 100 of the present embodiment in more details. The battery pack 100 includes the battery cells 10, the cell holders 20, the plates 30, the insulation layer 40, the heat-transfer sheet 50, and the cooler 60 as stated above, and further includes side plates 70 and a plurality of bolts 80. In one example, the battery cells 10, the cell holders 20, the plates 30, the insulation layer 40, and the side plates 70 make up a battery module 90 of the present embodiment. Although not shown, the battery pack 100 may include an electronic circuit board for monitoring and controlling the plurality of battery cells 10, other electrical components, and a housing for accommodating various members.

In one example, the battery cell 10 is a flattened rectangular lithium-ion secondary battery having a substantially cuboid shape. The battery cell 10 has side surfaces, including a pair of wide side faces 10*w* having a maximum area facing the thickness direction Dt of the battery cell 10, and a pair of narrow side faces 10*n* having a minimum area facing the width direction Dw of the battery cell 10. The battery cell 10 further has elongated rectangular bottom face 10*b* and top face 10*t* facing the height direction Dh of the battery cell 10.

In one example, the battery cell 10 has a cell case 11, a cell lid 12, and a pair of external terminals 13. The cell case 11 is a bottomed square tubular container having an opening at one end in the height direction. In one example, the cell case 11 is made of a metal material, such as aluminum or an aluminum alloy. In one example, the cell case 11 internally stores a storage element that is covered with an insulating sheet. The storage element is prepared by overlaying a strip-shaped positive electrode and a strip-shaped negative electrode while having a strip-shaped separator interposed therebetween and winding them. In one example, the cell case 11 is sealed with the cell lid 12 that is placed along the entire circumference of the opening at the upper end of the cell case 11 and is laser-welded.

The cell lid 12 is a substantially rectangular plate member that closes the opening of the cell case 11. In one example, the cell lid 12 is made of a metal material, such as aluminum or an aluminum alloy. The cell lid 12 has through holes to let the pair of external terminals 13 pass through at both ends in the longitudinal direction, and has a gas release valve 15 and a filling port 16 in the middle portion in the longitudinal direction.

The external terminals 13 each have a rectangular block shape that is a substantially cuboid, and are placed on the outer face of the battery lid 12, specifically, the top face 10*t* of the battery cell 10 via a gasket 14 having an electrical insulation property. Each external terminal 13 has a round pillar-shaped or cylindrical connection extending from the bottom face facing the cell lid 12 in the direction penetrating the cell lid 12. One of the pair of external terminals 13 is a positive external terminal connected to the positive electrode of the storage element via a positive collector plate in the cell case 11, and the other external terminal 13 is a negative external terminal connected to the negative electrode of the storage element via a negative collector plate in the cell case 11.

In one example, the gas release valve 15 is a portion of the cell lid 12 that is thinned by press-working and has a slit formed. When the internal pressure of the battery cell 10 increases to a predetermined pressure, this gas release valve 15 opens to release gas inside the battery cell 10, and so reduce the internal pressure of the battery cell 10 for safety.

The filling port 16 is for filling the cell case 11 with an electrolyte. In one example, after pouring the electrolyte, a plug 17 may be bonded there by laser welding for sealing of the filling port 16. Examples of the electrolyte to be poured into the cell case 11 include a non-aqueous electrolyte in which a lithium salt such as lithium hexafluorophosphate ($LiPF_6$) is dissolved in a carbonic ester-based organic solvent such as ethylene carbonate.

In one example, the cell holders 20 are made of an engineering plastic such as polybutylene terephthalate (PBT) or polycarbonate (PC) or a resin material such as rubber. The cell holders 20 hold the individual battery cells 10 while sandwiching them from both sides in the thickness direction Dt. Each cell holder 20 includes supports 21 that support the side faces of the battery cell 10 and an opening 22 that exposes the entire lower face 40*b* of the insulation layer 40 on the bottom face 10*b* of the battery cell 10 to the heat-transfer sheet 50.

In one example, each support 21 is a protrusion protruding toward the wide side faces 10*w* facing the thickness direction Dt of the battery cell 10. In one example, the support 21 is a rectangular protrusion having the longitudinal direction in the width direction Dw of the battery cell 10, the transverse direction in the height direction Dh of the battery cell 10, and the protruding direction in the thickness direction Dt of the battery cell 10. In one example, these supports 21 are disposed at positions to oppose both ends of the wide side face 10*w* of the battery cell 10 in the width direction Dw. The plurality of supports 21 of the cell holder 20 are placed at intervals in the height direction Dh of the battery cell 10. In this embodiment, four of the supports 21 in total are placed, including two of the them at each end of the cell holder 20 in the width direction Dw.

In one example, the plurality of cell holders 20 include a plurality of intermediate cell holders 20M and a plurality of end cell holders 20E. The intermediate cell holders 20M each intervene between adjacent two battery cells 10 of the plurality of battery cells 10 stacked in the thickness direction Dt. The end cell holders 20E are placed at both ends in the stacking direction (thickness direction Dt) of the plurality of battery cells 10 that are stacked via the intermediate cell holders 20M.

In one example, each end cell holder 20E has a fixing part 23 for fixing an input/output cable 101 of the battery pack 100. In one example, the fixing part 23 protrudes toward the plate 30. In one example, the fixing part 23 is insert-molded with a nut 23*a* or a bolt for fixing the input/output cable 101.

In one example, each cell holder 20 has a flat part 24 like a flat plate facing the wide side face 10*w* of the battery cell 10, and lateral parts 25 like a flat plate facing the narrow side faces 10*n* of the battery cell 10.

The flat part 24 of the intermediate cell holder 20M is placed between two adjacent battery cells 10 to prevent a contact between the two adjacent battery cells 10 and electrically insulate them. The flat part 24 of the end cell holder 20E is placed between the battery cell 10 at the end in the stacking direction and the corresponding plate 30, and prevents a contact between the battery cell 10 and the plate 30 to electrically insulate them. The flat part 24 has the plurality of supports 21 like protrusions at both ends in the width direction Dw of the battery cell 10. In one example, the lower end 24*b* of the flat part 24 and the lower face 40*b* of the insulation layer 40 covering the bottom face 10*b* of the battery cell 10 substantially coincide with each other in the height direction Dh of the battery cells 10.

The lateral parts 25 of each cell holder 20 extend along the thickness direction Dt of the battery cell 10 to a central portion of the narrow side face 10*n* substantially in parallel to the narrow side face 10*n* of the battery cell 10. The lateral parts 25 of each end cell holder 20E extend from the flat part 24 to a single side along the thickness direction Dt of the battery cell 10. The lateral parts 25 of each intermediate cell holder 20M extend from the flat part 24 to both sides along the thickness direction Dt of the battery cell 10. The lateral parts 25 of each cell holder 20 each have grooves 25*a* and 25*a* at the upper end and the lower end for engagement with the upper end and the lower end of the side plate 70 respectively. In one example, the lower end 25*b* of the lateral part 25 and the lower face 40*b* of the insulation layer 40 covering the bottom face 10*b* of the battery cell 10 substantially coincide with each other in the height direction Dh of the battery cells 10.

The pair of cell holders 20 is placed on both sides of each battery cell 10 in the thickness direction Dt to sandwich the battery cell 10, and have bumps and dents that engage with each other at their lateral parts 25. Engagement of these bumps and dents at the lateral parts 25 of these cell holders 20 as a pair defines an opening 22 at the lower end 20*b* of the pair of cell holders 20. The opening 22 at the lower ends 20*b* of the cell holders 20 is defined by the lower ends 24*b* and 25*b* of the flat parts 24 and the lateral parts 25 of the pair of cell holders 20 assembled in a cylindrical shape surrounding the corresponding battery cell 10. The opening 22 is a rectangle that exposes the entire lower face 40*b* of the insulation layer 40 on the bottom face 10*b* of the battery cell 10.

In one example, the plates 30 are rectangular plate members made of metal, and are end plates as a pair placed at both ends of the plurality of battery cells 10 in the stacking direction. The pair of plates 30 supports the plurality of battery cells 10 from both sides in the stacking direction, i.e., in the thickness direction Dt via the cell holders 20. In one example, each plate 30 has a recess 31 for receiving the fixing part 23 of the end cell holder 20E, screw holes 32 for fastening the side plates 70, and through holes 33 for inserting the bolts 80. Receiving the fixing part 23 of the end cell holder 20E by the recess 31 of the plate 30, the plate 30 supports and reinforces the fixing part 23 during fastening of the input/output cable 101 to the fixing part 23.

The insulation layer 40 extends to cover at least the entire bottom face 10*b* of each battery cell 10. In one example, the insulation layer 40 is formed with a film or coating having an electrically insulating property. In one example, the insulation layer 40 is made of a resin material having an electrical insulation property, such as polyethylene terephthalate (PET) or rubber. In one example, the insulation layer 40 may extend at least over the entire bottom face 10*b* of the battery cell 10, may extend over a part or the entire of the side faces of the battery cell 10 including the wide side faces 10*w* and the narrow side faces 10*n*, or may extend over the entire outer surface of the battery cell 10 other than the external terminals 13.

As shown in FIG. 5, the lower end 30*b* of each plate 30 protrudes downward from the lower face 40*b* of each insulation layer 40. In one example, the lower end 30*b* of the plate 30 is in contact with the upper face 60*a* of the cooler 60 and is supported by the upper face 60*a* of the cooler 60. In one example, the gap G between the lower face 40*b* of each insulation layer 40 and the cooler 60 in the height direction Dh of the battery cell 10, i.e., the protrusion height that is a distance from the lower face 40*b* of the insulation layer 40 to the lower end 30*b* of the plate 30 may be 0.1 [mm] or more and 1.0 [mm] or less.

In one example, the heat-transfer sheet 50 is a heat radiating sheet made of a material having excellent electrical insulation and heat conductivity, such as silicone, acrylic, and ceramic. In one example, the heat-transfer sheet 50 is compressed between the lower end 20*b* of each cell holder 20 or the lower face 40*b* of each insulation layer 40 and the upper face 60*a* of the cooler 60. This means that the entire lower face 40*b* of the insulation layer 40 on the entire bottom face 10*b* of each battery cell 10 is in contact with the upper face 50*a* of the heat-transfer sheet 50. The heat-transfer sheet 50 is pressed against the upper face 60*a* of the cooler 60 by the lower end 20*b* of each cell holder 20 and the lower face 40*b* of each insulation layer 40. This brings the entire lower face 50*b* of the heat-transfer sheet 50 in contact with the upper face 60*a* of the cooler 60.

In one example, the cooler 60 is a rectangular flat plate member made of metal, and internally includes a refrigerant channel through which the refrigerant circulates. In one example, the cooler 60 has screw holes 61 for fastening the bolts 80. The cooler 60 may be a part of the housing of the battery pack 100.

In one example, the side plates 70 are rectangular flat plate members made of metal. Each side plate 70 is a rectangular plate having the longitudinal direction in the stacking direction of the plurality of battery cells 10 and the transverse direction in the height direction Dh of the battery cells 10. The pair of side plates 70 is placed on both sides of the plurality of battery cell 10 in the width direction Dw, and is opposed to the narrow side faces 10*n* of the plurality of battery cells 10 via the lateral parts 25 of the cell holders 20.

The upper end of each side plate 70 is bent toward the center of the battery cells 10 in the width direction Dw, and engages with the grooves 25*a* at the upper ends of the lateral parts 25 of the plurality of cell holders 20. The lower end of the side plate 70 extends along the height direction Dh of the battery cells 10 and engages with the grooves 25*a* at the lower ends 25*b* of the lateral parts 25 of the plurality of cell holders 20.

Each side plate 70 has through holes at the both ends in the longitudinal direction to let bolts 71 pass through. The side plates 70 are fixed to the pair of plates 30 at both ends of the plurality of battery cells 10 in the stacking direction by fastening the bolts 71, which are passing through the through holes at the both ends, with the screw holes 32 of the plates 30. This defines the distance between the pair of plates 30, so that the battery cells 10 are each compressed and held in a predetermined range between the cell holders 20. The method of fixing the side plates 70 to the plates 30 is not limited to the bolts 71, and the side plates 70 may be fixed to the plates 30 by other means such as rivets, swaging, and welding.

The bolts 80 pass through the through hole 33 of the plates 30 and are fastened to the screw holes 61 of the cooler 60. As a result, the heat-transfer sheet 50 is compressed between the lower end 20*b* of each cell holder 20 or the lower face 40*b* of each insulation layer 40 and the cooler 60, and is pressed against the lower face 40*b* of each insulation layer 40 and the upper face 60*a* of the cooler 60 to be in contact with these faces.

In one example, the battery module 90 includes a plurality of battery cells 10, a plurality of cell holders 20, a pair of plates 30, an insulation layer 40 on the bottom face 10*b* of each battery cell 10, and a pair of side plates 70. The battery module 90 further includes a plurality of bus bars 91. The bus bars 91 are conductive metal plate members, and include intermediate bus bars 91M connecting the plurality of battery cells 10 in series and end bus bars 91E connecting the series-connected plurality of battery cells 10 to an input/output cable 101.

In the battery module 90, the plurality of battery cells 10 are stacked in the thickness direction Dt while alternately reversing the positions of the positive-electrode external terminals 13 and the negative-electrode external terminals 13, Of these plurality of battery cells 10, the positive-electrode external terminal 13 of one of the adjacent battery cells 10 in the stacking direction (thickness direction Dt) is sequentially connected to the negative-electrode external terminal 13 of the other battery cell 10 via the intermediate bus bar 91M, whereby the plurality of battery cells 10 is connected in series.

Of the plurality of battery cells 10 connected in series, the positive-electrode external terminal 13 of the battery cell 10 at one end in the stacking direction and the negative-electrode external terminal 13 of the battery cell 10 at the other end in the stacking direction are connected to a pair of end bus bars 91E, and each of the end bus bars 91E is connected to the input/output cable 101. In one example, the input/output cable 101 is connected to the end bus bars 91E by passing bolts 92, which pass through the terminal portions at the ends of the input/output cable 101, through the through holes of the end bus bars 91E, and fastening these bolts 92 to the nuts 23*a* of the fixing parts 23 of the end cell holders 20E.

The following describes advantageous effects of the battery pack 100 according to the present embodiment.

As described above, the battery pack 100 of the present embodiment includes a plurality of flattened battery cells 10, and a plurality of cell holders 20 that holds the individual battery cells 10 from their both sides in the thickness direction Dt for stacking them in the thickness direction Dt. The battery pack 100 further includes a plurality of plates 30 that support the plurality of battery cells 10 from both sides in the stacking direction via the cell holders 20, and an insulation layer 40 on the entire bottom face 10*b* of each of the battery cells 10. The battery pack 100 further includes a heat-transfer sheet 50 in contact with the lower face of each insulation layer 40, and a cooler 60 to cool the plurality of battery cells 10 via the heat-transfer sheet 50. The lower end 30*b* of each plate 30 protrudes downward from the lower face 40*b* of each insulation layer 40. Each cell holder 20 includes supports 21 that support the side faces of the battery cell 10 and an opening 22 that exposes the entire lower face 40*b* of the insulation layer 40 to the heat-transfer sheet 50.

When the battery module 90 with this configuration is placed on a supporting surface, such as a workbench, during the manufacturing process of the battery pack 100, the lower ends 30*b* of the plurality of plates 30 supporting the plurality of battery cells 10 from both sides in the stacking direction via the cell holders 20 are supported by the supporting surface. The lower ends 30*b* of the plates 30 protrude downward from the lower face 40*b* of each insulation layer 40, and this defines a space between the lower face 40*b* of each insulation layer 40 and the supporting surface supporting the battery 90. Therefore, foreign matter existing on the supporting surface, if any, is not pressed against the lower face 40*b* of the insulation layer 40 on the bottom face 10*b* of each battery cell 10, and so avoids a damage to the insulation layer 40. This prevents a short-circuit via the bottom face 10*b* of each battery cell 10 more reliably, and so improves the safety of the battery pack 100.

As described above, each cell holder 20 includes the supports 21 that support the side faces of the battery cell 10. The cell holders 20 hold the individual battery cells 10 from their both sides in the thickness direction Dt for stacking them in the thickness direction Dt, and so the supports 21 support the side faces of the battery cell 10 to fix the battery cell 10 to the cell holders 20. This eliminates the supporting of the battery cell 10 at the bottom face 10*b* by the cell holder 20, and so allows the cell holder 20 to have an opening 22 that exposes the entire lower face 40*b* of the insulation layer 40 on the entire bottom face 10*b* of the battery cell 10.

The cell holder 20 has such an opening 22 that exposes the entire lower face 40*b* of the insulation layer 40 to the heat-transfer sheet 50, so that the cooler 60 cools the entire bottom face 10*b* of the battery cell 10 via the insulation layer 40 and the heat-transfer sheet 50. This configuration improves the cooling performance for the battery cells 10 compared to the conventional power supply, in which the separators each have protrusions covering both ends of the bottom face of the battery cell.

In the battery pack 100 of the present embodiment, each support 21 of the cell holder 20 is a protrusion protruding toward the wide side face 10*w* facing the thickness direction Dt of the battery cell 10.

With this configuration, the supports 21 are pressed against the wide side faces 10*w* of the battery cell 10 from both sides in the thickness direction Dt of the battery cell 10, and so the battery cell 10 can be sandwiched between the supports 21 for supporting and fixing. More specifically, during the manufacturing process of the battery module 90, the cell holders 20 hold the individual battery cells 10 from both sides in the thickness direction Dt for stacking them in the thickness direction Dt, and then a force is applied to the plates 30 placed at both ends of the battery module 90 from both sides in the stacking direction to apply a predetermined compressive force to the battery cells 10 between the cell holders 20.

Then, the side plates 70 are fastened to the pair of plates 30 placed at both ends of the battery cells 10 in the stacking direction to fix the distance between the pair of plates 30. As a result, the supports 21 of the cell holders 20 are pressed against the wide side faces 10*w* of the battery cell 10 from both sides of the thickness direction Dt, and so the battery cell 10 is sandwiched between the supports 21 and is compressed with a predetermined amount of deformation to be supported and fixed. In this way, the cell holders 20 hold, support and fix the battery cells 10 without supporting the bottom faces 10*b* of the battery cells 10.

In the battery pack 100 of the present embodiment, the gap G between the lower face 40*b* of the insulation layer 40 on the bottom face 10*b* of each battery cell 10 and the cooler 60 is 0.1 [mm] or more and 1.0 [mm] or less, for example.

Such a gap G of 0.1 [mm] or more prevents electrical discharge between the bottom face 10*b* of each battery cell 10 and the cooler 60, even if holes or cracks occur in the lower face 40*b* due to deterioration over time. More specifically, the breakdown voltage of air is about 3 [MV/m]. The gap G therefore may be set at 0.1 [mm] or more, and this prevents electrical discharge in the battery pack 100 having a voltage of about 300 [V], for example. A gap G of 1.0 [mm] or less prevents unnecessary separation between the bottom face 10*b* of each battery cell 10 and the cooler 60, and so suppresses a deterioration in cooling performance for the battery cells 10.

As described above, the present embodiment provides the battery pack 100 that prevents a damage of the insulation layer 40 on the bottom face 10*b* of each battery cell 10, and improves the cooling performance for the battery cells 10 compared to the conventional ones. The battery pack according to the present disclosure is not limited to the configuration of the battery pack 100 of the present embodiment.

The present embodiment describes the configuration of the battery pack 100 including the supports 21 each being a protrusion. In the battery pack according to the present disclosure, the supports of the cell holders are not limited to protrusions. Specifically, in the battery pack according to the present disclosure, the supports of each cell holder may include an adhesive member that adheres to the side face of the battery cell for supporting. In the battery pack according to the present disclosure, the supports of each cell holder may include a bond that bonds to the side face of the battery cell for supporting.

Examples of the adhesive member include a member having adhesiveness used for adhesive tape, such as an acrylic adhesive, a urethane adhesive, and a silicone adhesive. Examples of the bond include a synthetic bond. When the supports of the cell holders include such adhesive members or bond, these supports may support the narrow side faces 10*n* facing the width direction Dw of the battery cells 10.

Figure 6:
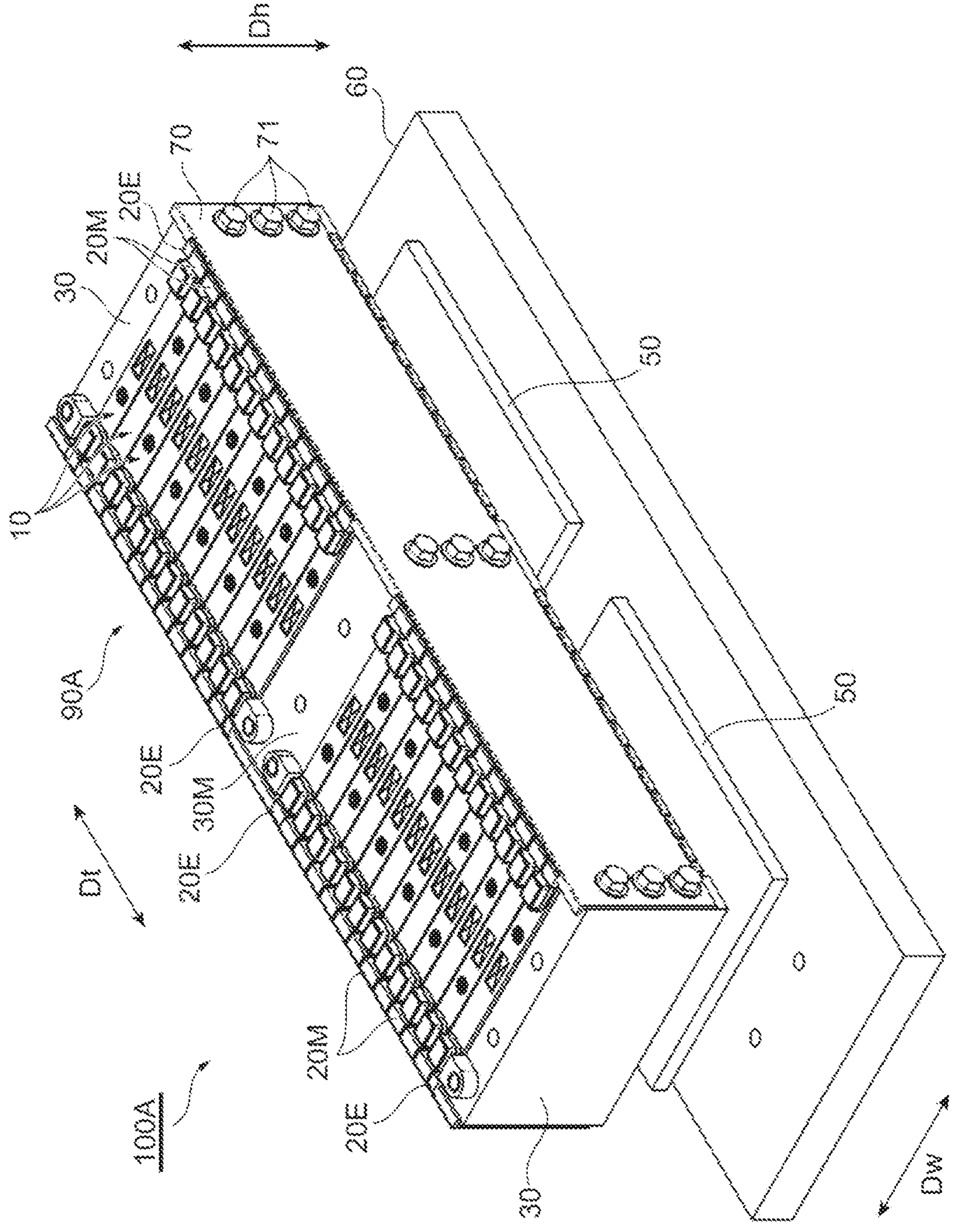
FIG. 6 is a schematic exploded perspective view of a battery pack that is a modified example of the battery pack shown in FIG. 1.
Figure 7:
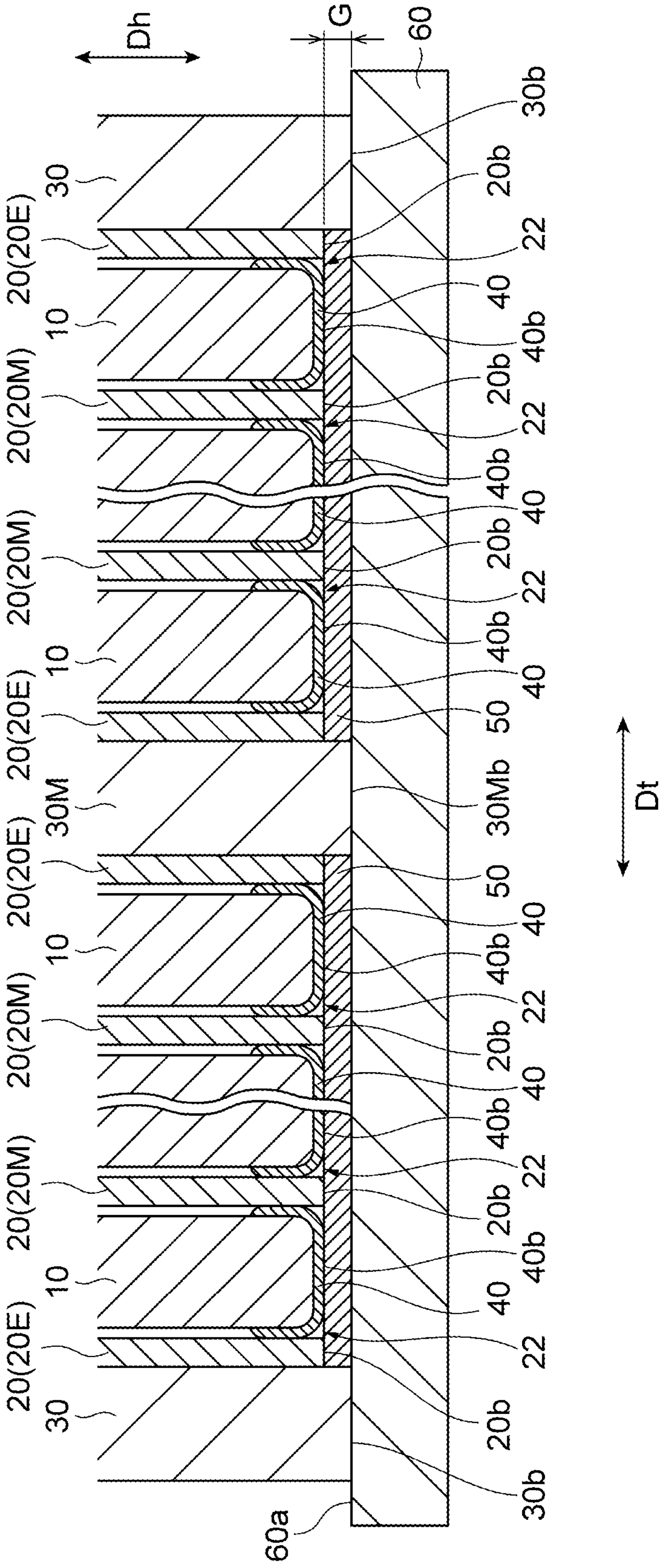
FIG. 7 is a schematic enlarged cross-sectional view of the battery pack shown in FIG. 6 along the stacking direction of the battery cells.

FIG. 6 is a schematic exploded perspective view of a battery pack 100A that is a modified example of the battery pack 100 shown in FIG. 1. FIG. 7 is a schematic enlarged cross-sectional view of the battery pack 100A according to the modified example shown in FIG. 6 along the stacking direction (thickness direction Dt) of the battery cells 10.

The battery pack 100A of this modified example is different from the battery pack 100 shown in FIG. 1 in that the battery module 90A includes an intermediate plate 30M at a center in the stacking direction of the battery cells 10. The battery pack 100A of the this modified example is similar to the battery module 100 shown in FIG. 1 in other respects. Like numerals indicate like parts, and their descriptions are omitted.

The battery pack 100A of this modified example is configured so that the intermediate plate 30M has a lower end 30Mb protruding downward from the lower face 40*b* of the insulation layer 40 similarly to the lower end 30*b* of the plate 30. The battery pack 100A according to this modified example, therefore, has the same advantageous effects as those of the battery pack 100 according to the above-described embodiment.

That is a detailed description of the embodiments of the battery pack according to the present disclosure, with reference to the drawings. The specific configuration of the present disclosure is not limited to the above-stated embodiments, and the design may be modified variously without departing from the spirits of the present disclosure. The present disclosure also covers such modified embodiments.

REFERENCE SIGNS LIST

10 Battery cell
10*b* Bottom face
10*n* Narrow side face (side face)
10*w* Wide side face (side face)
20 Cell holder
21 Support
22 Opening
30 Plate
30*b* Lower end
30M Intermediate plate (plate)
40 Insulation layer
40*b* Lower face
50 Heat-transfer sheet
60 Cooler
100 Battery pack
100A Battery pack
Dt Thickness direction
G Gap

The invention claimed is:

1. A battery pack comprising:

a plurality of flattened battery cells;

a plurality of cell holders located on both sides of each of the plurality of battery cells in a thickness direction of the plurality of battery cells to hold and stack the plurality of battery cells in the thickness direction, each of the plurality of cell holders including a flat part, at least one support extending from the flat part, a first lateral part extending from the flat part in the thickness direction, the first lateral part defining a first groove at an upper end of the first lateral part, a second groove at a lower end of the first lateral part, and a substantially planar surface extending between the first groove and the second groove, wherein the flat part is a continuous flat plate, wherein the first groove extends in a width direction inward at least partially over the flat part, wherein the second groove extends in a height direction and is positioned outward relative to the flat part;

a pair of plates that support the plurality of battery cells from both sides in the thickness direction of the plurality of battery cells via at least two of the plurality of cell holders, each plate of the pair of plates having a first hole; and an insulation layer on an entire bottom face of each of the plurality of battery cells, the insulation layer configured to contact an upper face of a heat-transfer sheet, the heat-transfer sheet having a lower face and a plurality of sides, the lower face of the heat-transfer sheet configured to contact a cooler, the cooler having a plurality of second holes and configured to cool the plurality of battery cells via the heat-transfer sheet, a side plate extending between the pair of plates, the side plate including a lower end positioned within the second groove of at least one cell holder of the plurality of cell holders, the side plate positioned against the substantially planar surface, the second groove formed at least partially by the substantially planar surface, wherein the first hole of each plate of the pair of plates corresponds to a second hole of the cooler to receive a fastener to couple each plate to the cooler, each plate of the pair of plates having a lower end protruding downward past the lower face of each insulation layer to define a gap between the lower face of each insulation layer and the cooler, the heat-transfer sheet positioned within the gap between the lower face of each insulation layer and the cooler, wherein the gap is bounded by the pair of plates in the thickness direction, bounded by the lower face of each insulation layer and the cooler in the height direction, and unbounded in the width direction, wherein the heat-transfer sheet is compressed within the gap between the cooler and the lower face of each insulation layer, wherein the at least one support is configured to support a side face of a corresponding battery cell of the plurality of battery cells, wherein each cell holder has an opening that extends along an entire width of the flat part and that exposes an entirety of the lower face of the insulation layer to the heat-transfer sheet, and wherein the lower end of each plate of the pair of plates extends downward past the lower end of the side plate.

2. The battery pack according to claim 1, wherein each of the plurality of battery cells has a wide side face facing the thickness direction, and the at least one support is a protrusion protruding toward the wide side face.

3. The battery pack according to claim 1, wherein the at least one support includes an adhesive member that adheres to the side face of the corresponding battery cell of the plurality of battery cells for supporting.

4. The battery pack according to claim 1, wherein the at least one support includes a bond that bonds to the side face of the corresponding battery cell of the plurality of battery cells for supporting.

5. The battery pack according to claim 1, wherein a gap between the lower face of the insulation layer and the cooler is 0.1 mm or more and 1.0 mm or less.

6. The battery pack according to claim 1, wherein the first groove and the second groove of the first lateral part are configured to engage a lateral part of an adjacent cell holder.

7. The battery pack according to claim 1, wherein the first lateral part extends from a first side of the flat part, the battery pack comprising:

a second lateral part extending from a second side of the flat part in the thickness direction, the second side separated from the first side by a first distance in a width direction; and the at least one support protruding from the flat part in the thickness direction against the first lateral part and extending a second distance in the width direction toward the second side, the second distance less than the first distance.

8. The battery pack according to claim 1, comprising:

the side plate including an upper end extending toward a center of the plurality of battery cells, the upper end positioned proximate an upper wall of the first groove, the upper wall of the first groove extending substantially horizontally.

9. The battery pack according to claim 1, wherein each plate of the pair of plates includes at least one third hole, wherein the side plate includes a plurality of fourth holes, wherein the third hole of each plate corresponds to a fourth hole of the plurality of fourth holes to receive a fastener to fasten the side plate to the pair of plates.

10. The battery pack according to claim 1, wherein at least one plate of the pair of plates defines a recess and at least one cell holder includes a fixing part protruding toward the at least one plate of the pair of plates, wherein the recess is configured to support the fixing part with the at least one cell holder abutting the at least one plate.

11. The battery pack according to claim 1, wherein the pair of plates include an intermediate plate and a first outer plate, wherein the heat-transfer sheet is a first heat-transfer sheet, wherein the plurality of battery cells is a first plurality of battery cells, the battery pack further comprising:

a second outer plate;

a second plurality of battery cells supported by and positioned between the intermediate plate and the second outer plate, the second plurality of battery cells each including an insulation layer configured to contact an upper face of a second heat-transfer sheet, the second heat-transfer sheet having a lower face and a plurality of sides, the lower face of the second heat-transfer sheet configured to contact the cooler, the cooler configured to cool the second plurality of battery cells via the second heat-transfer sheet;

the second outer plate having a lower end protruding downward past the lower face of each insulation layer to define a second gap between the lower face of each insulation layer of the second plurality of battery cells and the cooler, the second heat-transfer sheet positioned within the gap between the lower face of each insulation layer of the second plurality of battery cells and the cooler with each of the intermediate plate and the second outer plate contacting a side of the heat-transfer sheet, wherein the second heat-transfer sheet is compressed within the second gap between the cooler and the lower face of each insulation layer of the second plurality of battery cells.

* * * * *